(12) United States Patent
McMahon

(10) Patent No.: US 6,588,057 B2
(45) Date of Patent: Jul. 8, 2003

(54) AIR FILTER CLEANING DEVICE

(76) Inventor: Michael R. McMahon, 8809 Siwanoy Ct., Santee, CA (US) 92071

(*) Notice: Subject to any disclaimer, the term of this patent is extended or adjusted under 35 U.S.C. 154(b) by 0 days.

(21) Appl. No.: 09/933,226

(22) Filed: Aug. 20, 2001

(65) Prior Publication Data

US 2003/0033688 A1 Feb. 20, 2003

(51) Int. Cl.$^7$ ................................................ A47L 5/14
(52) U.S. Cl. .................... 15/405; 15/304; 15/316.1; 15/406
(58) Field of Search .................... 15/304, 395, 405, 15/406, 316.1

(56) References Cited

U.S. PATENT DOCUMENTS

| | | |
|---|---|---|
| 3,733,639 A | 5/1973 | Timian |
| 3,765,051 A | 10/1973 | Wanat |
| 3,958,296 A | 5/1976 | Fell |
| 4,048,693 A | 9/1977 | Axelrod et al. |
| 5,182,832 A | 2/1993 | McMahon |
| D439,646 S | 3/2001 | McMahon |

*Primary Examiner*—Theresa T. Snider
(74) *Attorney, Agent, or Firm*—Brown, Martin, Haller & McClain LLP

(57) ABSTRACT

An air filter cleaning device has en elongate, readily gripable handle having a through bore and a connector at one end for coupling to an air supply hose, and a rotary head is rotatably mounted on the other end of the handle. The rotary head has an internal air distribution chamber with small outlet openings in its outer peripheral wall for spraying air from the chamber. Rotor outlet passageways in the peripheral wall are arranged at an angle to cause the head to spin in a turbine-like fashion when air flow is directed from the chamber and out through the passageways. The rotating head sprays air outwardly across the surface of an air filter unit to dislodge dirt from filter paper in a filter unit.

13 Claims, 2 Drawing Sheets

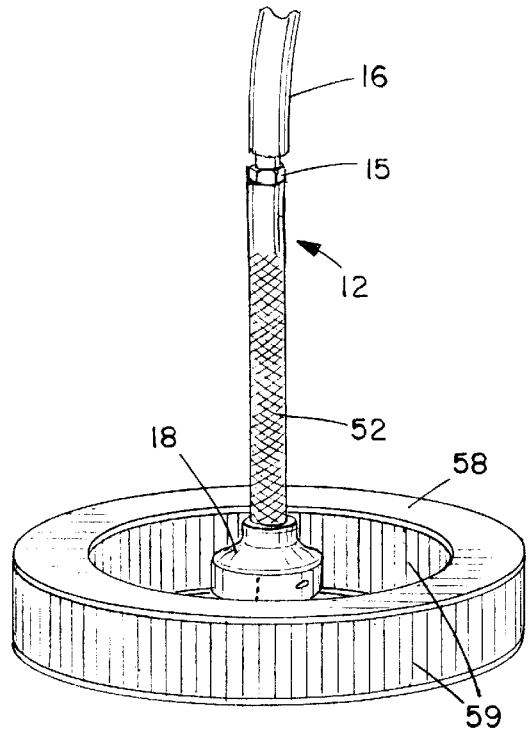
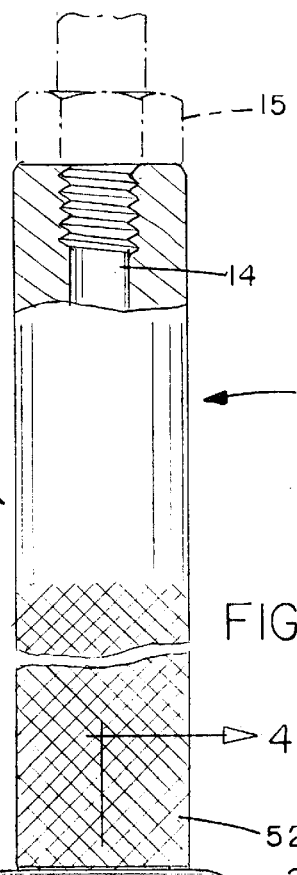
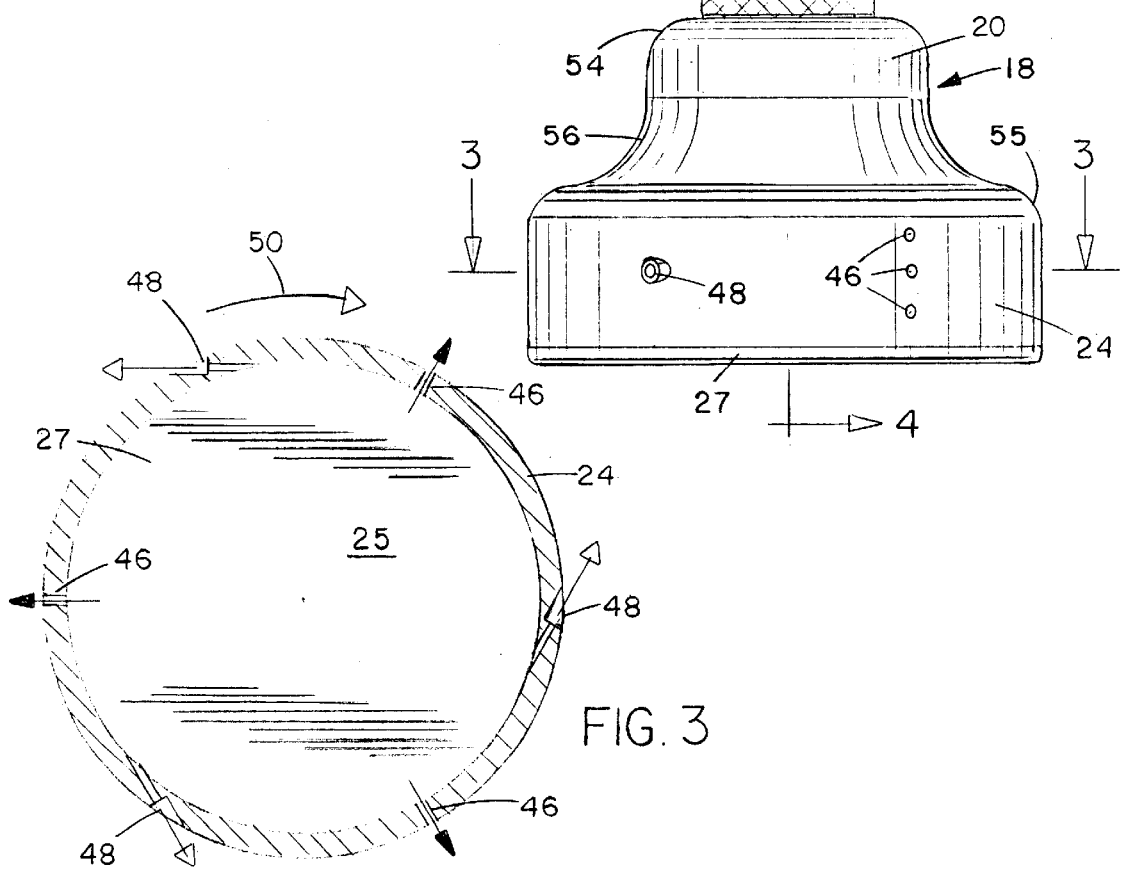

AIR FILTER CLEANING DEVICE

BACKGROUND OF THE INVENTION

The present invention relates generally to a device or tool for cleaning filter elements and is particularly concerned with a device for cleaning the air filters of automobiles and other types of vehicles or industrial engines.

Automobiles and other vehicles and machines having similar engines typically employ folded paper types of air cleaners for filtering dust and other particles from air entering the engine. In ordinary use these filters become clogged with accumulated dust and dirt, potentially choking off air supply to the engine, reducing power and increasing fuel consumption. Dirt may even be forced through the filter into the engine, causing damage to moving parts. Thus, air filters require replacement or cleaning on a regular basis. When the engine is in use under extreme conditions, for example vehicles used in a desert or an otherwise extremely dusty environment, frequent replacement or cleaning of the filters is needed. Since replacement is relatively expensive, it would be advantageous if the folded paper filter could be cleaned effectively to avoid the need for frequent replacement.

In the past, folded paper air filters for engines of various types have often been replaced when clogged, involving significant expense, or have been cleaned simply by directing an air hose at the filter element to blow out any loose particles or dust. However, the air blast from a standard high pressure air line is so powerful that it often damages the relatively fragile filter paper, requiring replacement. U.S. Pat. No. 3,733,639 of Timian describes such an arrangement, in which the filter unit is placed in an enclosure and an air hose extends into the enclosure into the center of the filter unit. A revolving air distributer in the form of a tubular element directed towards the filter element is connected to the inner end of the air line. Thus, a powerful blast of air is directed against the inner side of the annular filter element.

In my U.S. Pat. No. 5,182,832, a tubular member has a head rotatably mounted at one end, and an air hose can be secured at the other end. The head has small outlet openings spaced around its periphery for directing air flow outwardly across the inner side of an annular air filter unit. This tends to dislodge dirt without damaging the filter. However, this device can be difficult to handle and incorporates a press fit bearing which could potentially blow off under extreme conditions.

SUMMARY OF THE INVENTION

It is an object of the present invention to provide a new and improved air filter cleaning device.

According to the present invention, an air filter cleaning device is provided which comprises an elongate handle having a through bore, a connector at one end of the handle for connecting the handle through bore to an air supply hose, and an enlarged rotary head rotatably mounted on the opposite end of the handle. The rotary head has an internal air distribution chamber connected to the outlet end of the handle through bore, and three distribution outlets on the outer periphery of the head for directing air flow towards an air filter unit.

The head includes a rotor arrangement for re-directing air flow through the head so that the head is rotated relative to the inlet tube and air flow from the outlets directed across the entire area of an annular air filter unit surrounding the head. In one embodiment of the invention, the rotor arrangement comprises a series of angled rotor passageways in the peripheral wall of the chamber for directing air flow in a circular path from the chamber and thus spinning the head in the opposite direction to the air flow, in a turbine-like manner. In an exemplary embodiment, the head is generally cylindrical and the chamber is hollow, and the rotor passageways extend in a generally tangential direction relative to the chamber. The air outlets extend radially outwardly from the chamber to direct air onto a surrounding annular air filter, for example. By reducing the air flow and directing it out of a number of small outlets, the device can be connected to a standard high pressure air line while risk of damage to the filter paper of the air filter unit is reduced. At the same time, the variation in air pressure against the pleated or folded paper of the air filter unit as the head rotates will cause flapping of the paper, tending to dislodge any dirt or dust so that it can be blown off relatively easily.

In an exemplary embodiment, the rotary head has an inlet opening through which the second end of the handle extends, and a sealed radial bearing has an inner race secured to the second end of the handle, and an outer race secured to the inner wall of the chamber. The chamber may have a reduced diameter upper end portion in which the bearing is mounted, and the remainder of the chamber may be of larger diameter. Air flow is directed downwardly into the enlarged portion of the chamber and will flow outwardly through the air distribution outlets and rotor outlets.

This device allows an engine air filter to be cleaned without damaging the filter, using a standard air hose with the rotating head attached to diffuse the air flow and reduce the air velocity so that the relatively fragile filter paper is not damaged. This extends the lifetime of both vehicular and industrial engine filter units substantially, reducing maintenance costs and conserving materials. The elongate handle may have gripping surface for easy handling and use. The sealed bearing is more reliable, and is mounted securely to the handle and rotary head to reduce the risk of separation of the parts under extreme conditions.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 1 illustrates the air filter cleaning device according to an exemplary embodiment of the invention in use within a typical air filter;

FIG. 2 is an enlarged side elevation view of the device, partially cut away;

FIG. 3 is a sectional view taken on line 3—3 of FIG. 2; and

DETAILED DESCRIPTION OF THE DRAWINGS

Figure 4:
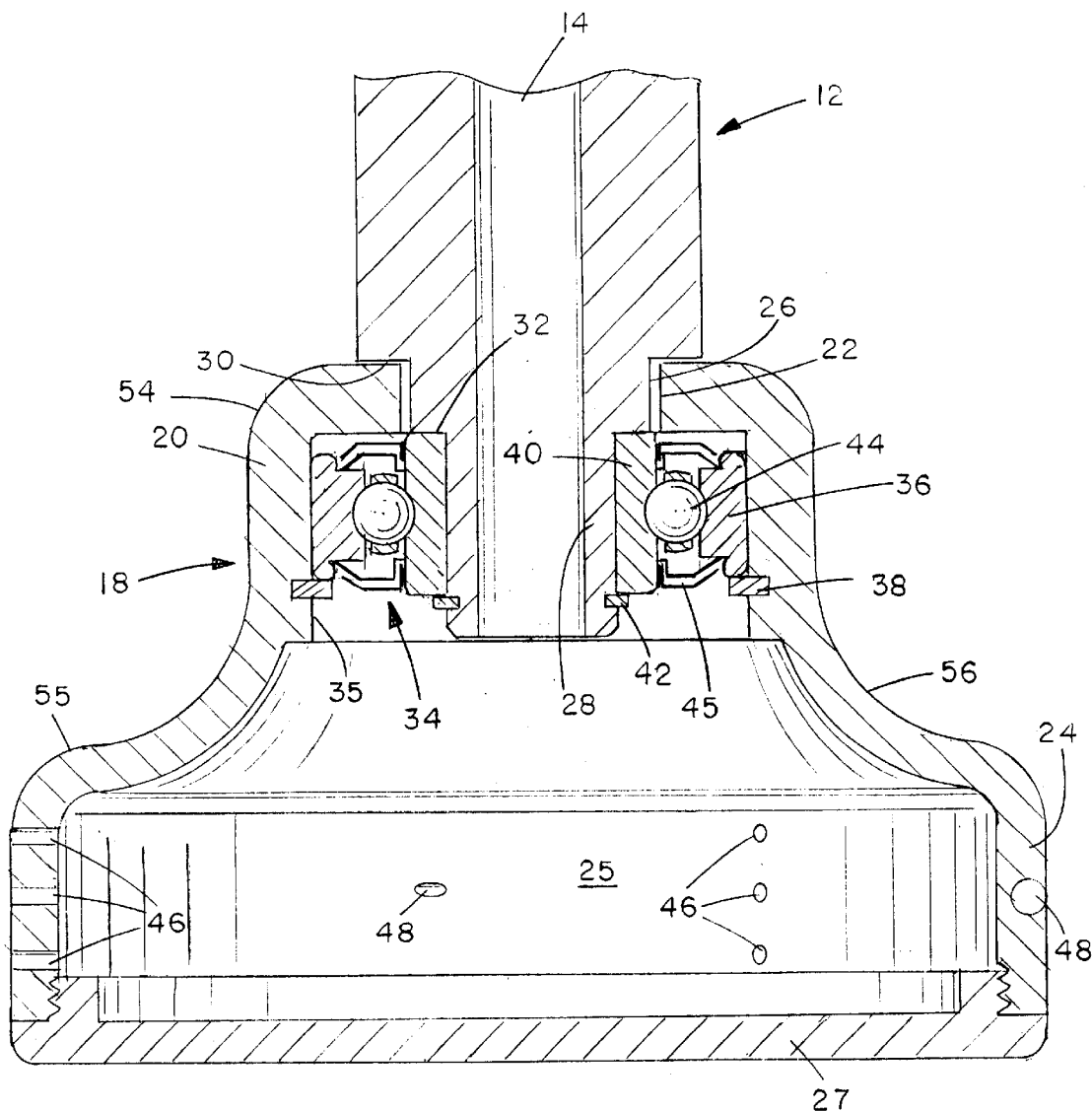
FIG. 4 is an enlarged sectional view taken on line 4—4 of FIG. 2.

An air filter cleaner 10 according to an exemplary embodiment of the present invention is illustrated in the drawings. The apparatus basically comprises an elongate handle or shaft 12 having a through bore 14, a standard air hose connector 15 at one end of shaft 12 for connection to an air hose 16, and a rotary air distribution or diffuser head 18 rotatably mounted on the opposite end of the handle 12.

Head 18 is generally cylindrical, with a reduced diameter upper end portion 20 having an inlet opening 22, and an enlarged lower end portion 24. The head has a hollow internal air distribution chamber 25 into which the end 24 of the stem projects through the upper inlet opening 22. The lower end of chamber 25 is closed by means of a removable end plate 27 which is releasably secured to the outer cylindrical peripheral wall of the chamber, as best illustrated in FIG. 4.

The lower end of handle 12 has first and second portions 26,28 of reducing diameter relative to the remainder of the handle shaft, defining a first annular shoulder 30 which rests against the upper end of the rotary head around the inlet opening 22, and a second annular shoulder 32 facing downwardly into the chamber 25. The first portion 26 is of diameter slightly less than that of opening 22 such that it extends through the opening with sufficient clearance to permit relative rotation between the handle 12 and head 18. A sealed rotary bearing 34 is held in the annular bearing chamber defined between the inner face 35 of the upper end portion of the head and the reduced diameter lower portion 28 of the handle.

As best illustrated in FIG. 4, the rotary bearing has a first or outer race 36 held on the inner face 35 of the head via a first snap ring 38, and an inner race 40 held on the reduced diameter portion 28 of the handle between the annular shoulder 32 and a second snap ring 42. A series of ball bearings 44 are held in an annular ring between the inner and outer races 40, 36 of the bearing, so that the head 18 is rotatably supported on the end of handle 12. The bearing is sealed by seals 45. Suitable sealed rotary or radial bearings are available from NSK of Schaumberg, Ill., and in one example of the invention an LLG mechani-seal snap ring combination was used, such as part number 6201-08VVC3.

The outer peripheral wall of the air distribution chamber 25 has three equally spaced sets of small, radial air outlets 46 equally spaced around its periphery, each set comprising a vertical row of three small outlets, as best illustrated in FIGS. 2 to 4. Three equally spaced rotor outlet passageways 48 are also provided in the enlarged lower end portion 24 of head 18, with each rotor outlet passageway being positioned between respective pairs of air outlets 46. The air outlets extend in a generally radial direction, while the rotor outlet passageways are directed generally tangentially relative to the outer periphery of the air chamber 25, so as to direct air flow out of the chamber in a generally circular, anti-clockwise path. This in turn will have a rotor effect causing the head 18 to spin in a clockwise direction on the stem, in the direction of the arrow 50 in FIG. 3.

The air outlet openings 46 are relatively small, and preferably of the order of 1/16 inch in diameter, so that the air flow velocity will be substantially reduced when passing from chamber 25 out of openings 46. Rotor outlet passageways 48 are of similar diameter to air outlet openings 46.

As best illustrated in FIGS. 1 and 2, the outer surface of the extended, elongate handle 12 has a knurled gripping surface 52 for easier holding by a user when operating the device to clean an air filter. The rotary head 18 and handle have surfaces which are hard anodized or gaulded for increased durability and reduced abrasion. The head 18 has smooth, rounded corners 54,55 extending from the upper end of the head to the smaller diameter, upper end portion 20 and from the flared step region 56 connecting the upper end portion 20 to the larger, cylindrical lower end portion 24 defining the air distribution chamber. The smooth, rounded corners are less likely to snag on a wearer's clothing or the like, and will make the tool safer to use.

FIG. 1 illustrates the air filter cleaner 10 in an operating position at the center of a typical vehicle air filter 58. Such air filters typically have pleated filter paper 59 for filtering air entering the engine, and this paper becomes soiled and clogged with repeated use, necessitating regular cleaning or replacement. In order to clean such filter paper, the upper end of handle 12 is first coupled to standard air hose 16 via air hose connector 15, which may be a quick-connect coupling, and the head 18 is positioned at the center of filter 58. When the air supply is turned on, air will flow downwardly into chamber 25 from the outlet end of bore 14, and will be directed radially outwardly through air outlets 46 and tangentially outwardly through rotor outlet passageways 48, as indicated by the arrows in FIG. 3.

High pressure air flowing into the chamber and out through the angled rotor outlets will cause the head to spin in a manner similar to a turbine, so that the air spraying radially from outlets 46 directly towards the filter paper 59 will travel across the entire annular inner surface of the paper 59. Vibration and movement of the filter paper caused by the rotating air jets, plus the reverse air flow through the filter, will cause accumulated dust and dirt to be forced outwardly from the filter. This arrangement will achieve spin velocities of 1200 to 1500 revolutions per minute when connected to a standard automobile service station air hose outlet. The small diameter outlets 46 will significantly reduce the air velocity so that the relatively fragile filter paper will not be damaged, but at the same time the air spray will blow off any loose dirt. The change in air pressure as the air outlets move across the surface of the filter will cause the paper to flap, tending to dislodge any dirt clinging to the paper so that it can also be blown off. The operation is fast and the filter can be cleaned quickly, easily, and safely, without damaging the filter. Thus, filter lifetime can be extended.

It will be understood that the cleaner apparatus can be used for cleaning filter units of other shapes and sizes than that illustrated in FIG. 1, and also for cleaning industrial filters as well as vehicle filters. The cleaner head may be physically moved across the surface of a filter while it is spinning, if necessary, for example to cover the entire surface area of a longer filter than that illustrated or a rectangular unit, for example.

Although an exemplary embodiment of the present invention has been described above by way of example only, it will be understood by those skilled in the field that modifications may be made to the disclosed embodiment without departing from the scope of the invention, which is defined by the appended claims.

I claim:

1. Air filter cleaning apparatus, comprising:
    an elongate handle having opposite first and second ends and a through bore extending between said ends;
    a coupling device at the first end of the handle for releasably connecting the through bore to an air hose;
    an enlarged head rotatably mounted at the second end of the handle, the head having an outer peripheral wall enclosing an internal air distribution chamber, the chamber being connected to said through bore, and the outer peripheral wall having a plurality of outlets spaced around its periphery for directing air out of the chamber towards an air filter unit;
    said head including rotor means for re-directing air in a direction to cause rotation of said head relative to said handle; and
    the head having an upper end portion and a lower end portion, the upper end portion having an inlet opening, the second end of said handle extending into said upper end portion with clearance, and a rotary connector in the upper end portion of said head rotatably connecting the second end of said handle to said head.

2. The apparatus as claimed in claim 1, wherein the handle has a knurled outer gripping surface.

3. The apparatus as claimed in claim 1, wherein an annular chamber is defined between the second end of said handle and an inner wall of said upper end portion of the head, and the rotary connector comprises a sealed radial bearing mounted in said annular chamber to form a seal between said inlet opening and said air distribution chamber.

4. Air filter cleaning apparatus, comprising:

an elongate handle having opposite first and second ends and a through bore extending between said ends;

a coupling device at the first end of the handle for releasably connecting the through bore to an air hose;

an enlarged head rotatably mounted at the second end of the handle, the head having an outer peripheral wall enclosing an internal air distribution chamber, the chamber being connected to said through bore, and the outer peripheral wall having a plurality of outlets spaced around its periphery for directing air out of the chamber towards an air filter unit;

said head including rotor means for re-directing air in a direction to cause rotation of said head relative to said handle; and the head having a first end having an inlet opening, a second, closed end, a first, generally cylindrical portion of a first diameter extending from said first end, and a second, generally cylindrical portion of a second diameter larger than said first diameter extending up to said second end and defining said air distribution chamber, the second end of said handle extending into said head through said inlet opening with a clearance between said handle and inlet opening.

5. The apparatus as claimed in claim 4, wherein the head has an outer surface with a smoothly rounded corner region between the first end of the head and the first generally cylindrical portion, a curving, outwardly flared step portion connecting the first and second generally cylindrical portions, and a second smoothly rounded corner region between the step portion and the second generally cylindrical portion.

6. Air filter cleaning apparatus, comprising:

an elongate handle having opposite first and second ends and a through bore extending between said ends;

a coupling device at the first end of the handle for releasably connecting the through bore to an air hose;

an enlarged head rotatably mounted at the second end of the handle, the head having an outer peripheral wall enclosing an internal air distribution chamber, the chamber being connected to said through bore, and the outer peripheral wall having a plurality of outlets spaced around its periphery for directing air out of the chamber towards an air filter unit;

said head including rotor means for re-directing air in a direction to cause rotation of said head relative to said handle; and the head having an upper, generally flat end having an inlet opening, the handle having a main portion of a first diameter, a first stepped portion of a second diameter less than said first diameter extending from said main portion, a second stepped portion of a third diameter less than said second diameter extending from said first stepped portion up to said second end, a first annular, downwardly facing shoulder between said main portion and first stepped portion and a second annular downwardly facing shoulder between said first stepped portion and second stepped portion, said second diameter being less than that of said inlet opening and said first stepped portion extending through said inlet opening, and said second annular downwardly facing shoulder facing downwardly towards said air distribution chamber.

7. The apparatus as claimed in claim 6, including a first snap ring on the second stepped portion of said handle adjacent the second end of the handle, and a radial bearing having an inner race secured on said second stepped portion of the handle between said first snap ring and second annular downwardly facing shoulder, and an outer race rotatably secured to said inner race and mounted in said chamber adjacent the upper end of said head.

8. The apparatus as claimed in claim 7, wherein the head has an inner, downwardly facing end wall substantially aligned with said second annular downwardly facing shoulder of said handle, and a first cylindrical inner wall portion extending downwardly from said end wall, and a second snap ring mounted on said inner wall portion at a location spaced below said end wall for securing outer race to said head.

9. Air filter cleaning apparatus, comprising:

an elongate handle having opposite first and second ends and a through bore extending between said ends;

a coupling device at the first end of the handle for releasably connecting the through bore to an air hose;

an enlarged head rotatably mounted at the second end of the handle, the head having an outer peripheral wall enclosing an internal air distribution chamber, the chamber being connected to said through bore, and the outer peripheral wall having a plurality of outlets spaced around its periphery for directing air out of the chamber towards an air filter unit;

said head including rotor means for re-directing air in a direction to cause rotation of said head relative to said handle; and the head having an upper, inlet chamber having an inlet opening and an outer wall, the second end of said handle extending through said inlet opening and inlet chamber and facing downwardly into said air distribution chamber, the head having an upper, annular inner wall forming the outer wall of said inlet chamber, and a rotary connector device mounted in said inlet chamber having an outer portion secured to the upper, annular inner wall of said head and an inner portion rotatably connected to said outer portion and secured to the handle.

10. The apparatus as claimed in claim 9, wherein said air distribution chamber is of larger dimensions than said upper, inlet chamber.

11. The apparatus as claimed in claim 9, including a seal between said upper inlet chamber and air distribution chamber.

12. The apparatus as claimed in claim 9, wherein said rotary connector device comprises a sealed radial bearing.

13. The apparatus as claimed in claim 9, including snap rings on said handle and outer wall of said upper inlet chamber securing said rotary connector device in said upper inlet chamber.

* * * * *